3,198,677
FOAMED POLYURETHANE GAS-GENERATING
COMPOSITIONS CONTAINING INORGANIC
OXIDIZER
Richard Ogden Thomas, Alexandria, Va., assignor to
Atlantic Research Corporation, Fairfax, Va., a corporation of Virginia
No Drawing. Filed July 27, 1962, Ser. No. 213,040
14 Claims. (Cl. 149—19)

This invention relates to energetic self-combustible cellular plastic compositions.

The object of the invention is to provide cellular organic polymer compositions which undergo self-sustained combustion.

Another object is to provide solid cellular monopropellant compositions of unique utility because of their special physical and ballistic properties.

Other objects and advantages will become obvious from the following detailed description.

Broadly speaking, my invention comprises forming a composition containing an oxidizer component into a solid cellular or foamed structure, at least one component of which is a solid organic polymer binder.

In terms of chemical composition, any solid, self-sustaining, gas-generating or monopropellant composition, containing an organic polymer binder known to the art can be employed for my purpose so long as it is formed physically into a cellular structure. Any of the several, well-known foaming techniques applicable to the particular polymeric binder component of the composition can be used to produce the foamed combustible structure.

The organic binder can be any suitable carbon-and-hydrogen-containing polymeric binder employed in the propellant art. It can be an active or oxidant-type polymer, namely one containing molecularly-combined oxidizing element, such as oxygen or fluorine, available for combustion or oxidation of other molecularly-combined components of said polymer, such as nitrocellulose. It can also (and more generally) be an inert organic polymer, namely one which does not contain combined oxygen or other oxidizing element available for combustion and therefore requires the addition of a separate or external oxidizer compound for combustion. Examples of such polymers include the vinyl polymers such as polyvinyl chloride, polyvinyl acetate and polystyrene; cellulose esters, such as cellulose acetate; cellulose ethers, such as ethyl cellulose; polyurethanes; polyepoxies; hydrocarbon polymers, such as polyethylene and polypropylene; polymerized acrylic and methacrylic acid esters and amides; urea-aldehyde and phenol-aldehyde polymers; synthetic rubber polymers, such as styrene-butadiene copolymers, butadiene-acrylonitrile copolymers, neoprene, a copolymer of 1, 3-butadiene and 2-vinylpyridine, a copolymer of 2-methoxy-3-ethylhexadiene and 3-vinyl-isoquinoline and the like.

As is conventional both in the organic polymer art and in the solid propellant art, the organic polymer binder can be plasticized with a suitable organic liquid plasticizer to impart or to improve desired physical and ballistic properties. The plasticizer can be an oxidant-type liquid containing active oxidizing groups such as nitro, nitrate, nitrite and nitroso groups, e.g. nitroglycerine, diethylene glycol dinitrate, pentaerythritol trinitrate, 1,2,4-trinitrobutane and the like, or inert organic liquid plasticizers, which function as an additional fuel component, as, for example, sebacates, such as dibutyl sebacate and dioctyl sebacate; phthalates, such as dibutyl phthalate and dioctyl phthalate; adipates, such as dioctyl adipate; glycol esters of higher fatty acids and the like.

The gas-generating or monopropellant composition can be of the double-base type, such as nitrocellulose plasticized with an oxidant-type organic liquid plasticizer as aforedescribed, such as nitroglycerine, or a mixture of such an oxidant-type plasticizer with an inert organic liquid plasticizer, as aforedescribed.

The gas-generating or monopropellant composition can also be of the conventional composite type, namely of the type which contains, in addition to a fuel compound, such as the organic polymer binders aforedescribed and/or plasticizer if present, a homogeneously dispersed, solid, insoluble, finely-divided oxidizer. Any insoluble solid oxidizer containing an oxidizing component, such as oxygen, fluorine, chlorine and the like, readily available for combustion, can be employed for my purpose. Such oxidizers are well known in the propellant art. They include, for example, inorganic oxidizer salts, such as the ammonium, Na, K, and Li chlorates, perchlorates, and nitrates; metal peroxides, such as sodium, K and Pb peroxide; hydrazine nitroformate; organic oxidizers, such as pentaerythritol tetranitrate, hexanitroethane, mannitol hexanitrate, and the like. The insoluble solid oxidizers can also be incorporated into the double-base type propellant compositions particularly when such compositions contain an inert fuel component, such as an inert plasticizer or a finely-divided, inert, solid fuel, such as a metal or metal hydride, which requires more oxidizer than can be provided by the active double-base components.

Other additives which can be employed in gas-generating or monopropellant compositions suitable for my purpose include finely-divided, solid fuels, such as B, Si, and particularly metals such as Al, Mg, Be, Zr, Ti; and their anhydrides, which are particularly desirable where high heats of combustion are desired. In some cases, it may be preferable to include coolants, such as monobasic ammonium phosphate, barbituric acid, ammonium oxalate and the like.

Although the cellular, oxidant compositions can generally be formulated to have exceedingly high burning rates, particularly at elevated combustion pressures, as is characteristic of monopropellants, still higher burning rates can be achieved by incorporating burning rate catalysts. Such catalysts are well-known in the art and include, for example, copper chromite, ammonium bichromate, ferric ferrocyanide, and the like.

Conventional additives such as foam stabilizing agents and surface-active dispersing agents can also be incorporated into the cellular compositions.

It will be understood that the amount of insoluble solid oxidizer required, if any, will be determined by the specific self-sustaining gas-generating or monopropellant composition. In the case of double-base type compositions, it can be dispensed with entirely because of the self-oxidant character of the polymer binder and, generally, at least a portion of the liquid plasticizer. In composite compositions, it must be present in amount sufficient to maintain active combustion of the fuel component or components. Beyond this the amount will be determined by the particular application of the foamed composition.

The compositions can be processed in a variety of ways well known in the art. They can be made for example, by mixing the fully cured polymer with liquid plasticizer and other additives, such as insoluble oxidizer, finely-divided insoluble solid fuel, and the like and then cured by heating to dissolve the plasticizer and polymer components. A technique particularly suitable for this mode of processing is the plastisol method in which the polymer, such as nitrocellulose, polyvinyl chloride, cellulose acetate, or ethyl cellulose, in the form of small, high-density spherical particles, together with other additives as aforementioned, is dispersed in the liquid plasticizer to produce a slurry which is then heated to solution temperature.

In many cases the gas-generating or monopropellant compositions are processed from a mixture of liquid monomers or liquid prepolymers into which the requisite additives such as oxidizer, metal or metal hydride fuels and the like are dispersed. The mixture is then cured catalytically and/or by heat. Examples of compositions particularly suited to such processing are the polyurethanes, the polyepoxies, the polymerized acrylic and methacrylic acid esters and amides, urea-aldehydes, phenol-aldehydes and the synthetic rubbers.

Any process for making foamed or cellular compositions known in the cellular polymer art can be employed for my purpose, it being necessary only to select a procedure best suited to the particular polymer composition, with further care being taken to avoid curing or foaming temperatures at or close to the auto-ignition temperature of the composition.

The foaming agent can be an inert gas, such as nitrogen or $CO_2$ introduced under pressure into the composition prior to curing and then permitted to expand by releasing the composition to ambient pressure.

The foaming agent can also be a compound dispersed in the propellant mix prior to curing, which is decomposed by the elevated cure or solution temperatures to form gases, such as nitrogen, carbon dioxide and the like. Examples of such blowing agents include $\alpha,\alpha'$-azobis(isobutyronitrile); 1,1'-azobis(formamide); N,N'-dinitrosopentamethylenetetramine; N,N'-dimethyl-N,N'-dinitrosoterephthalamide; diazoaminobenzene, p,p'-oxybis(benzenesulfonyl hydrazide); benzenesulfonylhydrazide; and the like.

Low boiling liquids such as water, ethanol, acetone, the liquid Freons, such as dichloromonofluoroethane, and the like, which volatilize at the curing temperature, can also be used as blowing agents.

In accordance with still other well-known processes, the blowing agent can be a gaseous product such as $CO_2$, produced as a by-product of the curing reaction. This is exemplified by the polyurethanes. If a small amount of water or carboxylic acid is provided in the reaction mixture, some of the available isocyanate groups react with these components to produce $CO_2$.

The density and cell structure of the foamed products can be varied and controlled in generally known fashion, as by use of different blowing agents, varying the reaction or cure temperature, varying component concentrations, the addition of foam stabilizing agents, and the like. Similarly, resilient, semirigid, and rigid cellular structures can be obtained in known manner by proper selection of the polymeric binder and/or plasticizer, use of rigidifying cross-linking agents, and the like.

I have found the foamed polyurethanes particularly suitable for my purpose. Such polymers are generally produced by reaction of a polyol with an organic polyisocyanate.

Suitable organic polyols include, for example, glycerol, trimethylol propane; butylene glycol; polyalkylene glycols, such as polyethylene glycol, polypropylene glycol, and polybutylene glycol; polyhydroxy polyesters, such as the reaction products of a polyhydroxy alcohol, e.g. glycerol, ethylene glycol, propylene glycol, polyethylene glycol, and trimethylol propane, with a polycarboxylic acid or anhydride, e.g. adipic acid, succinic acid, malonic acid, sebacic acid, diethylether dicarboxylic acid, maleic anhydride, and phthalic anhydride; esters of hydroxy carboxylic acids, such as castor oil and glyceryl monoricinoleate; polyhydroxy amino alcohols, such as, N,N,N',N'-tetrakis-(2-hydroxypropyl) ethylene diamine (Quadrol), triethanol amine; and the like.

Substantially any reactive organic polyisocyanate can be employed, including aliphatic diisocyanates, such as hexamethylene diisocyanate, and aromatic polyisocyanates, such as 2,4-tolylene diisocyanate, mixtures of 2,4-tolylene diisocyanate and 2,6-tolylene diisocyanate, m-phenylene diisocyanate, 3,3'-bitolylene-4,4'-diisocyanate, diphenylmethane-4,4'-diisocyanate, dianisidine diisocyanate, 1,5-naphthalene diisocyanate, tri-(p-isocyanylphenyl) methane, the triisocyanate adduct formed by reaction of 1 mol of hexanetriol and 3 mols of m-tolylene diisocyanate, and the like. The particular polyisocyanate selected is generally determined to a considerable extent by its reaction rate in a given reaction system and the properties which it imparts to the final polymer product. In a highly reactive system, the use of a somewhat less reactive aliphatic diisocyanate, such as hexamethylene diisocyanate can be advantageous to prevent excessive exotherm or to prevent excessive hardening of the polymeric structure before good cell formation is obtained. In general, the aromatic diisocyanates are preferred because of their more rapid reaction rates, and, in particular, 2,4- or a mixture of 2,4- and 2,6-tolylene diisocyanate, because of its excellent performance, availability and low cost.

The rate of reaction of a relatively slowly reactive polyol, such as castor oil or a polyester, with the polyisocyanate can be increased in accordance with conventional practice by means of a catalyst, such as an amine, preferably a tertiary amine, e.g. N-methyl morpholine, triethylene diamine, or triethyl amine, or metal salts, e.g. iron acetyl acetonate, lead naphthenate, cobalt naphthenate, zinc stearate, tributyl tin methacrylate, dibutyl tin dilaurate, dibutyl tin oxide, sodium stearate, sodium ricinoleate, sodium salicylate, sodium citrate, or the like. Although, in general, such catalysis is a function of basicity of the reaction mixture, with inorganic acids acting as inhibitors, Lewis acids, such as trimethyl boron, have catalytic activity. Where a highly reactive polyol, particularly a basic polyol, such as Quadrol or triethanol amine, is included in the reaction mixture, a catalyst can generally be dispensed with.

Any conventional foaming agent can be employed. Water, which reacts with the polyisocyanate to form $CO_2$ is generally preferred because of its low cost and ease of use. A carboxylic acid, preferably of low molecular weight, such as acetic acid, propionic acid, lactic acid, or $\beta$-hydroxy propionic acid, can also be used for its $CO_2$ forming reaction with the polyisocyanate. Other suitable foaming agents include inert gases, such as nitrogen or $CO_2$ injected into the reaction mixture under pressure, low-boiling, non-solvent, volatile compounds, such as the Freons, e.g. trichloromonofluoromethane, dichlorodifluoromethane, dichlorotetrafluoroethane, and the like, and compounds which are decomposed by the heat produced by the exothermic polymerization reaction to form expanding gases, such as azo bis-isobutyronitrile, diazoaminobenzene, 1,1' azo-bis-(formamide), N,N'-dinitrosopentamethylene tetramine, N,N'-dimethyl-N,N'-dinitroso terephthalamide, benzene sulfonyl hydrazide, ammonium and sodium carbonate and bicarbonate, and the like.

When water is employed as the foaming agent, it is generally desirable to follow the conventional practice of including an emulsifier as a dispersing and stabilizing agent since water and most polyisocyanates are relatively immiscible and may, therefore, react too slowly. The emulsifier can be dispensed with if other components, such as a basic polyol, also possess surface-active characteristics. Any suitable surface-active agent can be employed, such as polyoxyethylated vegetable oils, polyglycol esters of fatty acids, polyglycol aryl and higher fatty alcohol ethers, alkyl aryl sulfonates, dialkyl sulfo-succinates, petroleum sulfonates, higher fatty acid soaps and sulfated fatty acid soaps, etc.

Particularly effective for one-shot operation and because of their rigid properties are the polyurethane foams described in Stewart et al. application Ser. No. 813,334 of common assignee, filed May 15, 1959. This application discloses foamed polyurethanes comprising the reaction product of a polyhydroxy alcohol ester of ricinoleic acid containing at least two ricinoleyl groups and having an equivalent weight in terms of its functional hydroxy groups above 200, such as castor oil; a second organic polyol containing at least three functional alcoholic hydroxy groups and having a maximum equivalent weight in terms of its functional hydroxy groups of about 125, such as Quadrol; an organic polyisocyanate, such as toluenediisocyanate; a polymerizable ethylenically-unsaturated monomer containing at most one reactive hydroxy group, such as styrene and diallyl phthalate; and a foaming agent.

*Example 1*

A mixture of the following components was prepared:

| | Parts by wt. |
|---|---|
| N,N,N',N'-tetrakis-(2 - hydroxy - propyl)ethylene diamine | 60 |
| Castor oil | 40 |
| Styrene | 20 |
| Sulfonated petroleum oil emulsifier | 0.5 |
| Water | 0.5 |

60 parts of the above mixture were combined with 40 parts of ammonium perchlorate. 57 parts of toluene diisocyanate (TDI) were then added to the mixture. Foaming began in a few seconds and was completed in about 1 minute. The foamed product was semi-rigid and burned cleanly and rapidly.

*Example 2*

A foamed composition was prepared similar to that of Example 1 except that ammonium nitrate was substituted for the ammonium perchlorate, with substantially similar results.

*Example 3*

The following stock solution was prepared:

| | Parts by wt. |
|---|---|
| Quadrol | 420 |
| Castor oil | 280 |
| Diallyl phthalate | 140 |
| Ethyl cellulose | 21 |
| Water | 8 |

The following foamed compositions were prepared employing the above stock solution for formation of the polyurethane binder. In all cases the finely-divided metal fuel and the oxidizer salt were admixed with the stock solution prior to addition of the toluene diisocyanate.

(A)

| | Parts by wt. |
|---|---|
| Stock solution | 44.6 |
| Mg | 11.7 |
| Ammonium perchlorate | 35.2 |
| TDI | 26.0 |

(B)

| | |
|---|---|
| Stock solution | 44.6 |
| Mg | 12.8 |
| Ammonium perchlorate | 45.0 |
| TDI | 26.0 |

(C)

| | |
|---|---|
| Stock solution | 44.6 |
| Mg | 14.1 |
| Ammonium perchlorate | 56.4 |
| TDI | 26.0 |

(D)

| | |
|---|---|
| Stock solution | 42.0 |
| Al | 9.36 |
| Ammonium perchlorate | 23.6 |
| TDI | 24.4 |

Burning rate=16 in./sec. at 500 p.s.i.; 19 in./sec. at 1000 p.s.i.

The unique advantages of the self-combustible cellular compositions lie in their:

(1) Low density, which minimizes dead weight problems and reduces cost;

(2) High burning rate, which can be utilized very rapidly to produce high temperature combustion gases or very rapidly to remove the cellular structure when it has served its purpose;

(3) Unitary structure, which can be shaped into any desired configuration and which can be resilient, semi-rigid, or rigid, depending on the particular application or use.

Because of their low density, high burning rate, and ready conformity into any desired shape, the energetic cellular compositions are particularly suitable for use in igniting solid and semi-solid propellants. They can be molded or otherwise shaped to extend over a considerable portion of the grain ignition surface. Upon ignition, as for example, by means of a conventional squib or other igniter, the cellular ignition material burns and rapidly ignites the entire initial grain ignition surface. It is especially suitable for use in igniting the top surface of a pool of semi-solid monopropellant. Because of its low density, it can be floated on the monopropellant in the form of pellets, a large disc, or the like, without other mechanical support.

The rigid energetic foams are particularly suitable for use as mold, die or mandrel elements in or around which molded objects can be formed, shaped or cast. Examples include molded plastics, propellant grains, concrete, and the like. The unique advantage of use of the energetic cellular structure for such applications lies in the fact that they can be rapidly removed at any time after the casting operation is completed merely by being ignited and burning away.

The rigid energetic foams can also be employed as structural supports, as for example for a solid propellant grain seated in a rocket motor, which is subjected to accelerative or other stresses prior to ignition. Upon ignition, at which point the structural support is no longer needed, the combustible support burns away practically instantaneously and leaves no undesirable impediment in the motor.

It will be understood that the term "oxidizer component" as employed herein refers to oxidant-type polymer binders and oxidant-type plasticizers as well as to oxidizer compounds included for combustion of inert polymer binder and plasticizer fuel compounds.

Although this invention has been described with reference to illustrative embodiments thereof, it will be apparent to those skilled in the art that the principles of this invention can be embodied in other forms but within the scope of the claims.

I claim:

1. In a solid, self-combustible gas-generating or monopropellant composition comprising an inert organic polymer binder which does not contain a combined oxidizing element available for combustion and which requires the addition of a separate oxidizer for combustion and a finely-divided, solid, insoluble, inorganic oxidizer dispersed in said binder, said oxidizer being present in an amount which maintains active combustion of said composition, the improvement in which said composition forms the cell walls of an integral foamed cellular structure.

2. The composition of claim 1 in which the composition forming the cell walls additionally contains dispersed therein a solid, finely-divided fuel selected from the group consisting of B, Si, a metal, and a metal hydride.

3. The composition of claim 2 in which the organic polymer binder is a polyurethane.

4. The composition of claim 3 in which the solid finely-divided, dispersed fuel is Al.

5. The composition of claim 1 in which the organic polymer binder is a polyurethane.

6. The composition of claim 5 in which the polyurethane is the reaction product of a polyhydroxy alcohol ester of ricinoleic acid containing at least two ricinoleyl groups and having an equivalent weight in terms of its functional hydroxy groups above 200; a second polyol containing at least three functional alcoholic hydroxy groups and having a maximum equivalent weight in terms of its functional hydroxy groups of about 125; an organic polyisocyanate; and a polymerizable ethylenically-unsaturated monomer containing at most one hydroxyl group.

7. The composition of claim 6 in which the oxidizer is an inorganic oxidizer salt.

8. The composition of claim 7 in which the composition forming the cell walls additionally contains dispersed therein a solid finely-divided fuel selected from the group consisting of B, Si, a metal and a metal anhydride.

9. The composition of claim 8 in which the solid, finely-divided fuel is Al.

10. The composition of claim 1 in which the inert organic polymer binder is selected from the group consisting of vinyl polymers, cellulose esters, cellulose ethers, polyurethanes, polyepoxies, hydrocarbon polymers, polymerized acrylic and methacrylic acid esters and amides, urea-aldehyde and phenolaldehyde polymers and synthetic rubber polymers.

11. The composition of claim 10 in which the organic polymer binder is a polyurethane.

12. The composition of claim 1 in which the finely-divided, solid, insoluble, inorganic oxidizer is selected from the group consisting of inorganic oxidizer salts and metal peroxides.

13. The composition of claim 12 in which the composition forming the cell walls additionally contains dispersed therein a solid, finely-divided fuel selected from the group consisting of B, Si, a metal and a metal hydride.

14. The composition of claim 13 in which the organic polymer binder is a polyurethane.

References Cited by the Examiner

UNITED STATES PATENTS

| | | | |
|---|---|---|---|
| 1,444,594 | 2/23 | Dehn | 149—2 X |
| 2,768,072 | 10/56 | Stark | 149—92 X |
| 2,845,025 | 7/58 | Stark | 149—92 X |
| 3,049,454 | 8/62 | Stark | 149—2 |

FOREIGN PATENTS 839,078  1/59  Great Britain.

CARL D. QUARFORTH, *Primary Examiner.*
LEON D. ROSDOL, *Examiner.*